(No Model.)
J. BOOTH.
BEARING FOR THE JOURNALS OF LOWER DRAWING ROLLERS IN SPINNING MACHINES.
No. 384,344. Patented June 12, 1888.
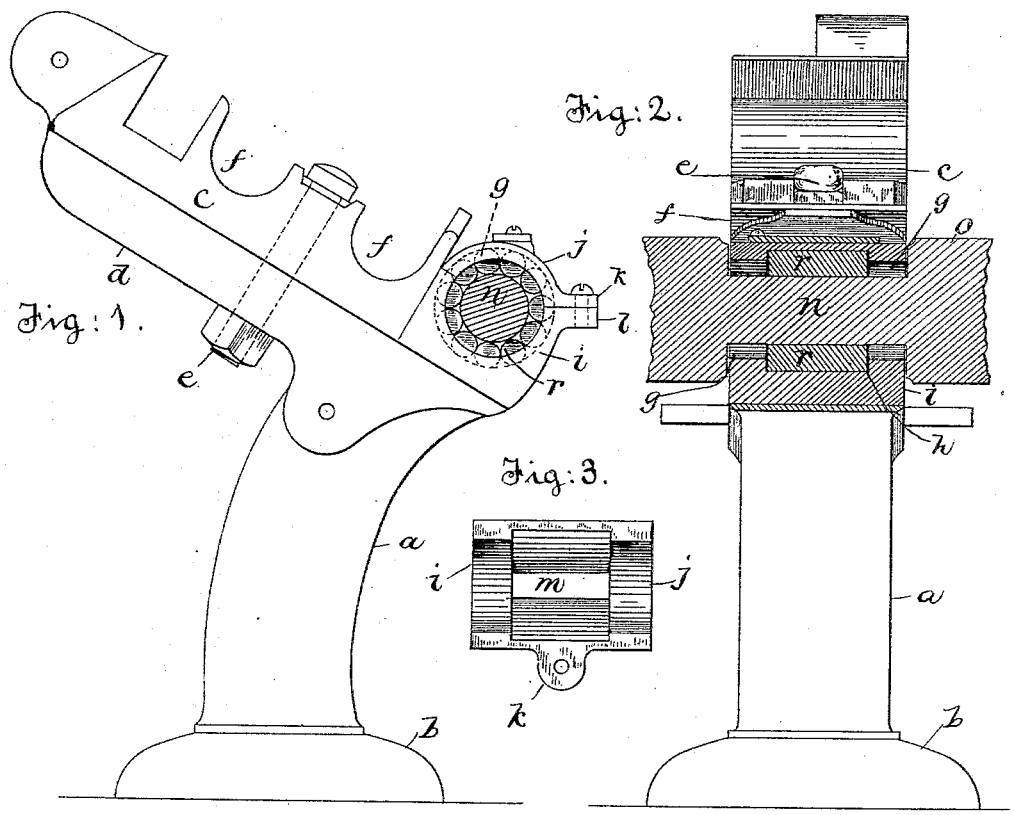

UNITED STATES PATENT OFFICE.

JOHN BOOTH, OF CENTRAL FALLS, RHODE ISLAND.

BEARING FOR THE JOURNALS OF LOWER DRAWING-ROLLERS IN SPINNING-MACHINES.

SPECIFICATION forming part of Letters Patent No. 384,344, dated June 12, 1888.

Application filed May 10, 1886. Serial No. 201,686. (No model.)

*To all whom it may concern:*

Be it known that I, JOHN BOOTH, of Central Falls, in the county of Providence and State of Rhode Island, have invented certain new and useful Improvements in Bearings for the Journals of Lower Drawing-Rollers in Spinning-Machines, of which the following is a specification.

My invention relates to spinning-frames and analogous machines, and particularly to the drawing-rollers of such machines.

As is well known to those skilled in the art to which this invention most nearly appertains, the upper rollers in drawing and spinning frames and analogous machines have an imposed weight, and the lower rollers are driven by power and carry those above. This imposed weight upon the upper fluted rollers of the delivery pair is quite great, being ordinarily about three hundred pounds to each bearing; and in order to accommodate as many spindles as possible on the spindle-supporting rail such bearings between the ends of the rollers must necessarily be short. With this construction, and under the conditions mentioned, the wear of the journals and bearings of the fluted rollers is very great, necessitating a copious use of oil on said journals and bearings to prevent undue wear and the expenditure of much power in the operation of the machine. This oil or lubricant creeps from the bearings to the external surfaces of the rollers, causing the fibers of the material being operated upon to adhere to the rollers, preventing the use of rubber, which is desirable, on the surfaces of said rollers.

It is the object of my invention to overcome as far as possible the friction and wear of the journals and bearings of the lower fluted delivery-roller and obviate the necessity of using oil or other lubricant with the injurious effect hereinbefore noted.

Of the drawings hereto annexed and forming a part of this specification, Figure 1 represents a side view of a stand or support for the drawing-rollers of a spinning-frame embodying my invention, only the lower fluted roller being shown as in position therein, and said roller being represented in section. Fig. 2 represents a vertical section of the parts shown in Fig. 1, said section being taken through the journal and bearings of the lower delivery-roller. Fig. 3 represents a part of the sectional bearing-boxes.

Similar letters of reference indicate similar parts in all of the figures.

In the drawings, $a$ represents the post of a roller-stand; $b$, the base thereof, and $c$ the support for the journal-bearings, the latter being secured to an inclined extension, $d$, of the post $a$ by means of a headed bolt and nut, $e$. The journal-bearing support $c$ is provided with rounded recesses $f\ f$ for the journals of the lower rollers of the two rear pairs of rollers, and has provisions for other contrivances, all as is common in devices of this character, but with which my invention has nothing to do.

To provide a bearing for the journals of the lower delivery-rollers, I form a rounded recess, $g$, a little larger in size than, though similar in form to, recesses $f$ in the lower end of the support $c$, forming also a deeper recess, $h$, at the same point, which deeper recess extends nearly though not quite to the edges of the support $c$, so that the recess $g$ will merely form flanges $i$ to the deeper recess, $h$, as shown in Fig. 2 and in dotted lines in Fig. 1. A cap, $j$, having its under side constructed to conform as to shape with the recesses $g\ h$, is made to fit over the bearing formed for the journals of the lower delivery-rollers, as above set forth, which cap is provided with an ear, $k$, adapted to be attached to a corresponding ear, $l$, formed on the support $c$, by which means the cap is secured to the support. Cap $j$ is provided with an elongated aperture, $m$, in its top, for a purpose to be presently explained.

The journals $n$ of lower rollers, $o$, are a little less in diameter than the diameter of the hole formed by the outer surface of the flange $i$, when cap $j$ is secured in position, as described, and the shoulders at the ends of the journals $n$ run in close contact with the adjacent sides of the stand, so that should oil or other lubricant be employed it could not readily creep from the journal to the surface of the rollers.

The journal $n$ being placed in position in the bearing-support provided therefor, and cap $j$ secured in place thereon, rollers $r\ r$, of metal or other suitable material, are dropped through aperture $m$, so as to form a complete circle there around, flanges $i$ serving to prevent any lateral or endwise displacement of rollers r, the diameters of which are just sufficient to cause journal n to fit closely in its bearings though not to bind therein. Rollers r are thus made to form the direct bearing for journal n, and as the latter is revolved it turns rollers r by frictional contact therewith, and the latter rolling in the recess h of the support c reduces the friction to a minimum, overcomes the difficulties and objections heretofore existing, and secures the ends of the objects aimed at by my invention.

Having thus described my invention, I claim—

The combination, with the stand having the bearing provided with the inwardly-extending flanges, of the roller o, provided with the reduced bearing portion to form shoulders, a series of rollers, r, arranged in said bearing to surround and be in contact with said reduced portion, the shoulders of the roller being located close to said bearing, and a removable cap, j, for closing the bearing and maintaining the continuity of the arrangement of rollers r, substantially as described.

In testimony whereof I have signed my name to this specification, in the presence of two subscribing witnesses, this 4th day of May, 1886.

JOHN BOOTH.

Witnesses:
WILLIAM H. GOODING,
JAMES E. BOWEN.